US011952805B2

(12) United States Patent
Lindmayer et al.

(10) Patent No.: US 11,952,805 B2
(45) Date of Patent: Apr. 9, 2024

(54) DOOR LOCK HAVING ENERGY ABSORPTION

(71) Applicant: DAIMLER AG, Stuttgart (DE)

(72) Inventors: Martin Lindmayer, Sulz (DE); Tobias Konrad, Böblingen (DE); Stefan Ebersohn, Boeblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 329 days.

(21) Appl. No.: 17/285,238

(22) PCT Filed: Oct. 9, 2019

(86) PCT No.: PCT/EP2019/077389
§ 371 (c)(1),
(2) Date: Apr. 14, 2021

(87) PCT Pub. No.: WO2020/078803
PCT Pub. Date: Apr. 23, 2020

(65) Prior Publication Data

US 2021/0372168 A1 Dec. 2, 2021

(30) Foreign Application Priority Data

Oct. 16, 2018 (DE) ..................... 10 2018 008 175.4

(51) Int. Cl.
*E05B 77/38* (2014.01)
*E05B 81/14* (2014.01)
(Continued)

(52) U.S. Cl.
CPC .............. *E05B 77/38* (2013.01); *E05B 81/14* (2013.01); *E05B 81/20* (2013.01); *E05B 81/06* (2013.01); *E05B 81/10* (2013.01)

(58) Field of Classification Search
CPC .......... E05B 77/38; E05B 81/06; E05B 81/10; E05B 81/14; E05B 81/20
See application file for complete search history.

(56) References Cited

U.S. PATENT DOCUMENTS 6,422,616 B1 * 7/2002 Wortmann .............. E05B 83/24 292/216
8,469,438 B2 6/2013 Mazur et al.
(Continued)

FOREIGN PATENT DOCUMENTS

CN 103806764 A 5/2014
CN 105593444 A 5/2016
(Continued)

OTHER PUBLICATIONS

Office Action dated Aug. 31, 2022 in related/corresponding CN Application No. 201980068007.8.
(Continued)

*Primary Examiner* — Kristina R Fulton
*Assistant Examiner* — James Edward Ignaczewski
(74) *Attorney, Agent, or Firm* — PATENT PORTFOLIO BUILDERS PLLC

(57) ABSTRACT

A door lock arrangement of a vehicle door of a vehicle includes a first closing element arranged in a lock mouth of the vehicle door and a second closing element arranged on a body of the vehicle. The first and second closing elements can be brought into positive-locking engagement with each other to hold the door on the body. A damping device absorbs kinetic energy of the door during a closing movement of the door within a predetermined limit opening angle of the vehicle door relative to the body and slows down the closing movement of the door. The damping device has an impact element arranged on the door in a displaceable manner relative to the door or on the body in a displaceable manner relative to the body. The impact element is con-
(Continued)

Figure 1:
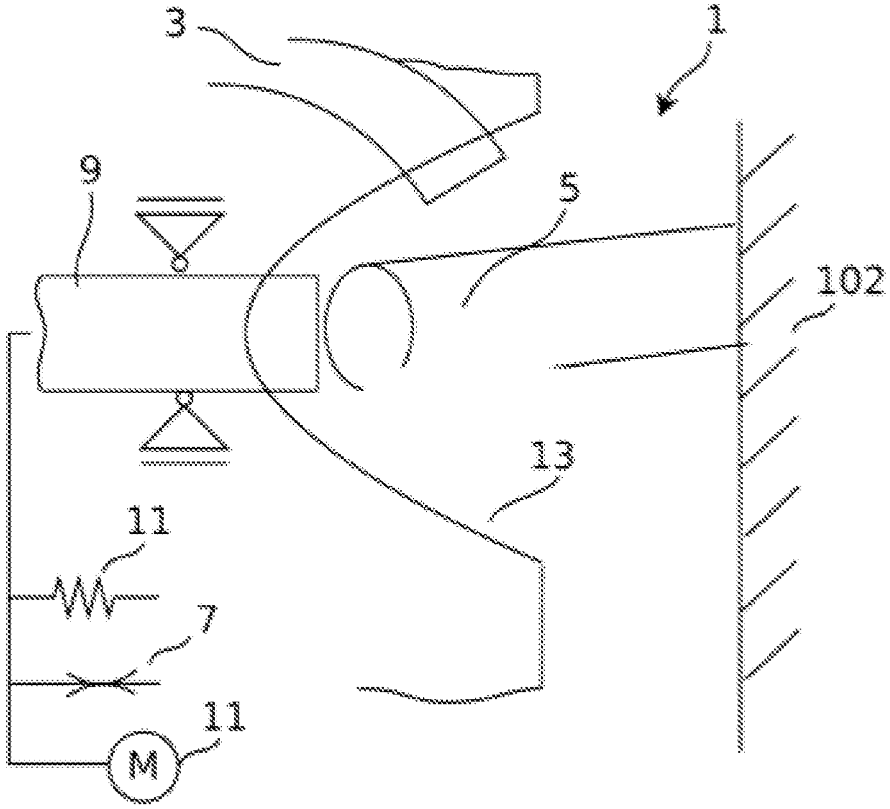

nected to an actuator, which applies a pre-tensioning force of the door directed in an opening direction of the door while the first and second closing elements are engaged with each other.

11 Claims, 2 Drawing Sheets

(51) Int. Cl.

| | |
|---|---|
| ***E05B 81/20*** | (2014.01) |
| *E05B 81/06* | (2014.01) |
| *E05B 81/10* | (2014.01) |

(56) References Cited

U.S. PATENT DOCUMENTS

| | | | | |
|---|---|---|---|---|
| 8,631,608 | B1 * | 1/2014 | Konchan | E05B 77/38 292/341.12 |
| 10,323,443 | B2 | 6/2019 | Berger et al. | |
| 2016/0305170 | A1 * | 10/2016 | Berger | E05B 81/20 |
| 2018/0080266 | A1 | 3/2018 | Lebsak et al. | |
| 2018/0155965 | A1 * | 6/2018 | Estrada | E05B 81/20 |
| 2019/0169889 | A1 | 6/2019 | Beck | |
| 2020/0056406 | A1 * | 2/2020 | Nelsen | E05B 83/00 |

FOREIGN PATENT DOCUMENTS

| | | | | |
|---|---|---|---|---|
| CN | 106065745 | A | 11/2016 | |
| CN | 207092751 | U | 3/2018 | |
| CN | 207847327 | U | 9/2018 | |
| DE | 10058044 | A1 | 6/2002 | |
| DE | 10058044 | A1 * | 6/2002 | E05B 77/08 |
| DE | 10324339 | A1 | 12/2004 | |
| DE | 102005016186 | A1 | 10/2006 | |
| DE | 102005016186 | A1 * | 10/2006 | E05B 77/08 |
| DE | 102006030732 | A1 | 1/2008 | |
| DE | 102007001715 | A1 | 7/2008 | |
| DE | 102007001715 | A1 * | 7/2008 | E05B 77/36 |
| DE | 102012206695 | A1 | 10/2012 | |
| DE | 102016107111 | A1 | 10/2016 | |
| DE | 102016114494 | A1 | 2/2018 | |
| DE | 102016011162 | A1 | 3/2018 | |
| EP | 2251509 | A2 | 11/2010 | |
| EP | 2251509 | A2 * | 11/2010 | E05B 77/38 |
| EP | 2821572 | A2 * | 1/2015 | E05B 77/38 |
| EP | 2251509 | B1 | 1/2017 | |
| JP | 855145285 | A | 11/1980 | |
| JP | H03156082 | A | 7/1991 | |
| WO | WO-2017186229 | A1 * | 11/2017 | E05B 77/38 |

OTHER PUBLICATIONS

Office Action dated Apr. 1, 2022 in related/corresponding CN Application No. 201980068007.8.

International Search Report dated Jan. 23, 2020 in related/corresponding International Application No. PCT/EP2019/077389.

Office Action dated Oct. 2, 2019 in related/corresponding DE Application No. 10 2018 008 175.4.

Written Opinion dated Jan. 23, 2020 in related/corresponding International Application No. PCT/EP2019/077389.

Office Action dated Aug. 26, 2021 in related/corresponding CN Application No. 201980068007.8.

* cited by examiner

DOOR LOCK HAVING ENERGY ABSORPTION

BACKGROUND AND SUMMARY OF THE INVENTION

Exemplary embodiments of the invention relate to a door lock arrangement of a vehicle door of a vehicle, a vehicle having such a door lock arrangement, and a method for closing a vehicle door of a vehicle with respect to a body of the vehicle.

DE 10 2016 114 494 A1 relates to a door handle for a vehicle door of a motor vehicle, having a moveable emergency opening element which can be brought into a mechanical operative connection with a closing system of the vehicle door, wherein the emergency opening element has a pulling means for actuating the locking system, in particular for unlocking and/or for opening the vehicle door, and wherein the emergency opening element can be moved between at least two positions, namely a rest position, in which the emergency opening element can be brought into a mechanical operative connection with a closing system of the vehicle door, in which the emergency opening element is fastened to the door handle, and an operating position in which the emergency opening element can be actuated by a user in order to actuate the closing system by pulling on the pulling means, and a release device for the emergency opening element in order to transfer the emergency opening element automatically from the rest position to the operating position, in particular in an emergency situation, wherein the emergency opening element is arranged on an underside of the door handle.

DE 10 2016 011 162 A1 relates to a locking device for a vehicle door, in particular for a vehicle front flap, comprising a first pawl pre-tensioned into a locked position, wherein a rotary latch is lockable in a closed position by the first pawl in its locked position, and a second pawl also pre-tensioned into a locked position, wherein the rotary latch can be fixed or locked in a catch hook position by the second pawl located in its locked position, characterized in that the first and second pawls can be transferred from their respective locked position into a release position by the same actuation.

DE 10 2012 206 695 A1 relates to a fastening element for attaching a cladding to a base panel, wherein the fastening element comprises: a clasp portion extending along the longitudinal axis and comprising a first clasp wall arranged along a first wall plane, a second clasp wall laterally spaced from the first class wall, and a clasp end wall interconnecting the first clasp wall and the second clasp wall, wherein the first clasp wall, the clasp end wall and the second clasp wall define a channel having a U-shaped cross-section perpendicular to the longitudinal axis and adapted to slidably receive an edge of said base plate in locking engagement therewith; a support wall attached to the second clasp wall and extending away from the second clasp wall to a distal edge laterally spaced from the second clasp wall; and a latch adapted to releasably engage the clasp from a direction approximately perpendicular relative to the plane through a slot defined in the cladding, wherein the latch comprises: a first latch portion attached to the distal edge of the support wall and extending away from the plane towards a hinge portion: a second latch portion attached to the hinge portion and extending towards the plane in a spaced relationship relative to the first latch portion: wherein the first latch portion comprises the first retaining feature extending away from the second latch portion, and the second latch portion comprises a second retaining feature which extends away from the first latch portion and is arranged across a latch plane opposite the first retaining feature; wherein the first latch portion and the second latch portion are configured to resiliently press against each other in order to allow the first retaining feature of the first latch portion and the second retaining feature of the second latch portion to pass through the slot in the cladding and subsequently spring outwardly away from the plane of the latch, such that the first retaining feature and the second retaining feature engage with the cladding and secure the cladding in its position; and at least one finger configured to continuously pre-tension the cladding in order to reduce movement of the cladding relative to the latch.

Exemplary embodiments of the invention are directed to reducing noise caused by vehicle doors.

A first aspect of the invention relates to a door lock arrangement of a vehicle door of a vehicle, having a first locking element arranged in a lock mouth of the vehicle door and a second locking element arranged on a body of the vehicle, wherein the first locking element and the second locking element are positively engageable with each other for holding the vehicle door on the body, further having a damping device configured to absorb kinetic energy of the vehicle door and to slow down the closing movement of the vehicle door during a closing movement of the vehicle door within a predetermined limit opening angle of the vehicle door with respect to the car body, wherein the damping device has an impact element, wherein the impact element is arranged on the vehicle door in a displaceable manner relative to the vehicle door or on the body in a displaceable manner relative to the body, and wherein the impact element is connected to an actuator, wherein the actuator is designed to apply a pre-tensioning force, directed in an opening direction of the door, of the vehicle door relative to the body while the first closing element and the second closing element are engaged with each other.

In particular, the limit opening angle is the angle at which the impact element undergoes a forced movement caused by the door closure. This forced movement allows the damping device to become active, and to extract energy from the movement.

In particular, the lock mouth has a cavity into which the second closing element is inserted when the vehicle door is closed, and serves primarily as a receptacle for the first closing element. A door handle is preferably arranged on the outer side of the vehicle door at the level of the lock mouth.

The vehicle may be a passenger car, lorry, bus, rail vehicle, water vehicle (for example, ship), underwater vehicle, or an aircraft.

In particular, the damping device is arranged and designed to generate a force that is dependent on the speed of the moving impact element and is directed against the movement of the impact element.

It is an advantageous effect of the invention that, when the vehicle door is closed, significantly more energy is absorbed by the damping device than, for example, merely via an elastomer seal between the vehicle door and a door frame of the body. This results in particular from the further travel of the impact element compared with the elastomer seal. This reduces the noise generated when a vehicle door slams shut, in particular one that is caused by the hard components of the vehicle door striking the body due to corresponding compression of the elastomer buffers. A further advantageous noise reduction results from the application of the pre-tensioning force of the vehicle door directed in an opening direction of the door relative to the body. In particular, if the door seal counter-pressures are too low (i.e., the counterforce applied by the compressed door seal when the first and second closing elements are engaged) while the vehicle is in motion, the vehicle door could otherwise strike against the door frame of the vehicle body and thus cause the door to rattle.

According to an advantageous embodiment, the actuator is a spring element.

The spring element is in particular a metallic spiral spring, in particular a spiral spring made of spring steel.

The spring element as an actuator thus preferably has two purposes: on the one hand, the actuator serves to apply a pre-tensioning force, directed in the opening direction of the door, to the vehicle door relative to the body while the first closing element and the second closing element are in engagement with each other. On the other hand, the actuator having a spring element (or, alternatively, an appropriately controlled motor for applying an artificial spring force) serves as a spring during the door closing itself, such that the actuator together with the damping device forms a spring-damper element, i.e., a second-order transmission member. Preferably, this spring-damper element is critically or super-critically damped to prevent the vehicle door from springing back during closing.

According to a further advantageous embodiment, the actuator has an electric motor.

The electric motor is preferably controlled by a control unit in such a way that immediately after the first closing element and the second closing element have been brought into engagement with each other, the electric motor moves the impact element accordingly until the desired pre-tensioning force is generated.

According to a further advantageous embodiment, the impact element is a cylindrical piston.

According to a further advantageous embodiment, the impact element is arranged in the lock mouth so as to be displaceable relative to the vehicle door, such that the impact element is pressed against the second closing element within the predetermined limit opening angle of the vehicle door relative to the body during the closing movement of the vehicle door.

According to a further advantageous embodiment, the first closing element has a rotary latch and the second closing element has a bolt, wherein, when the first closing element is brought into engagement with the second closing element by rotating the rotary latch around the bolt, the rotary latch and the bolt are fixable to each other.

According to a further advantageous embodiment, the damping device has a fluid damper.

The fluid damper is preferably a gas damper or an oil damper.

According to a further advantageous embodiment, the fluid damper is a shear damper. Preferably, in this case the shear damper is a so-called honeycomb wheel having a toothed rim and the fluid damping unit arranged thereon.

A further aspect of the invention relates to a vehicle having a door lock arrangement as described above and below.

A further aspect of the invention relates to a method for closing a vehicle door of a vehicle in relation to a body of the vehicle, wherein a first closing element is arranged in a lock mouth of the vehicle door and a second closing element is arranged on the body of the vehicle, having the steps:

- moving the vehicle door in the direction of the body of the vehicle,
- absorbing kinetic energy of the vehicle door with a damping device while the vehicle door is within a predetermined limit opening angle of the vehicle door with respect to the body to slow down the closing movement of the vehicle door, wherein the damping device has an impact element, wherein the impact element is arranged on the vehicle door in a displaceable manner with respect to the vehicle door or on the body in a displaceable manner with respect to the body, and
- bringing the first closing element and the second closing element into engagement with each other for holding the vehicle door on the body in a positive-locking manner, and
- applying a pre-tensioning force, directed in an opening direction of the door, of the vehicle door relative to the body by an actuator, while the first closing element and the second closing element are engaged with each other.

Advantages and preferred developments of the proposed method emerge from an analogous and corresponding transfer of the statements made above in connection with the proposed door lock arrangement.

Further advantages, features and details emerge from the following description, in which—possibly with reference to the drawing—at least one exemplary embodiment is described in detail. Identical, similar and/or functionally identical parts are provided with the same reference numerals.

BRIEF DESCRIPTION OF THE DRAWING FIGURES

Figure 2:
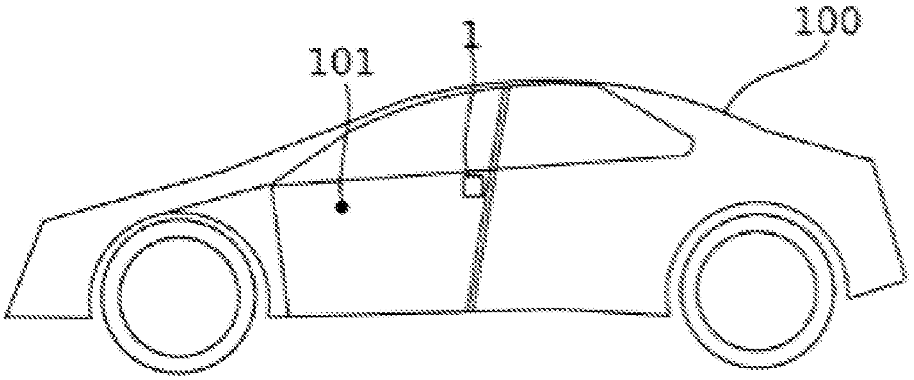
Figure 3:
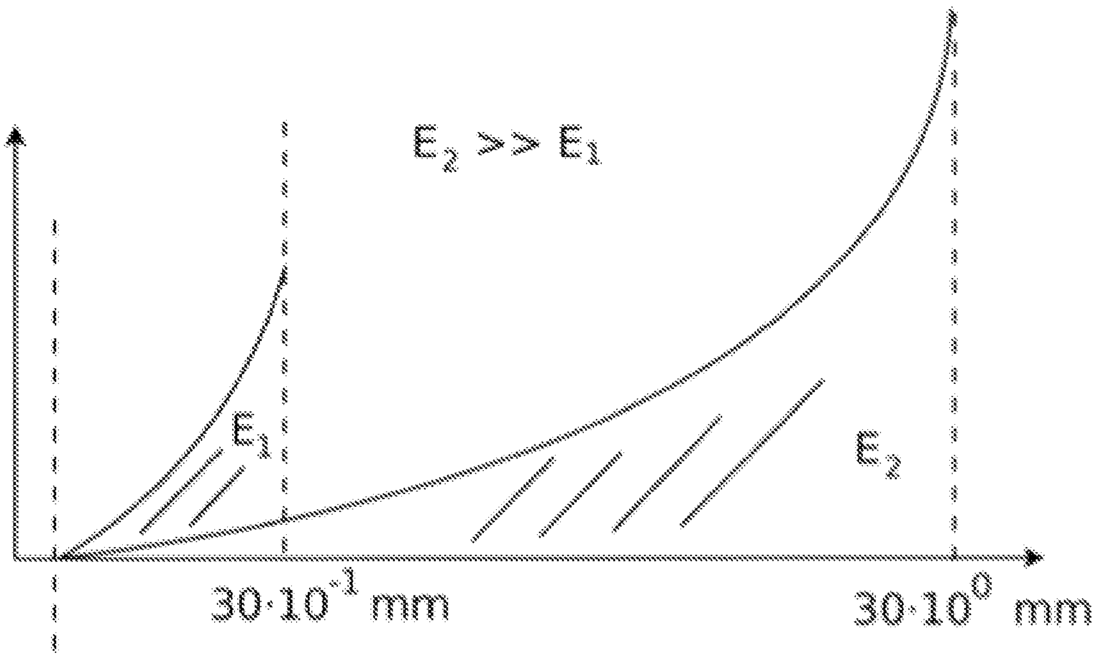
Figure 4:
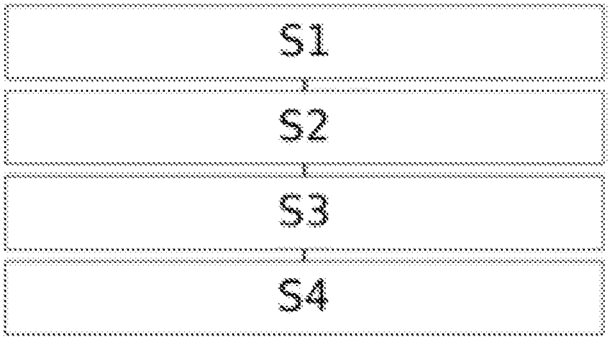

Here are shown:

FIG. 1 a door lock arrangement of a vehicle door of a vehicle according to an exemplary embodiment of the invention, FIG. 2 a vehicle having a door lock arrangement according to a further exemplary embodiment of the invention, FIG. 3 a damping characteristic curve of a damping device of a door lock arrangement according to a further exemplary embodiment of the invention, and FIG. 4 a method for closing a vehicle door of a vehicle in relation to a body of the vehicle according to a further exemplary embodiment of the invention.

The depictions in the figures are schematic and not to scale.

DETAILED DESCRIPTION

FIG. 1 shows a door lock arrangement 1 of a vehicle door 101 of a vehicle 100, having a first closing element 3 (a rotary latch not shown) arranged in a lock mouth 13 of the vehicle door 101 and a second closing element 5 (namely a bolt connected to the body 102 of the vehicle 100) arranged on a body 102 of the vehicle 100, wherein the first closing element 3 and the second closing element 5 can be brought into engagement with each other in a positive-locking manner for holding the vehicle door 101 on the body 102. Furthermore, the door lock arrangement 1 has a damping device 7 which is designed to absorb kinetic energy of the vehicle door 101 during a closing movement of the vehicle door 101 within a predetermined limit opening angle of the vehicle door 101 relative to the body 102 and to slow down the closing movement of the vehicle door 101. For this purpose, the damping device 7 has a cylindrical impact element 9, wherein the impact element 9 is arranged on the vehicle door 101 and is displaceable relative to the vehicle door 101, i.e., the impact element 9 is arranged in the lock mouth 13 in a displaceable manner relative to the vehicle door 101 and, during the closing movement of the vehicle door 101, is pressed against the second closing element 5 within the predetermined limit opening angle of the vehicle door 101 relative to the body 102. The impact element 9 is further connected to an actuator 11, wherein the actuator 11 is configured to apply a pre-tensioning force of the vehicle door 101 directed in an opening direction of the door with respect to the body 102 while the first closing element 3 and the second closing element 5 are engaged with each other. Here, the actuator 11 is an electric motor combined with a spring element. The electric motor serves primarily to apply the pre-tensioning force of the vehicle door 101 with respect to the body 102, while the spring element together with the damping device 7 primarily serves to provide a super-critically damped spring-damper element to reduce kinetic energy of the vehicle door during closing. However, both are mechanically coupled to each other.

FIG. 2 shows a vehicle 100 having a door lock arrangement 1 as shown in FIG. 1. In this embodiment, the vehicle door 101, having the door lock arrangement 1, has a side door of the vehicle 100.

FIG. 3 shows a damping characteristic curve of a damping device 7 of a door lock arrangement 1, wherein the left of the two curves in FIG. 3 describes the energy absorption E1 of an elastomer sealing element from the prior art, and the right of the two curves describes the energy absorption E2 of a damping device 7 of the door lock arrangement 1 of a vehicle door 101 described in FIG. 1. Here, the horizontal axis denotes the travel distance, and the vertical axis denotes the generated force, such that the integral of the respective curve indicates the absorbed energy. Due to the possible travel distance of the impact element 9, possibly absorbable energy E2 is significantly greater than the energy E1 that can be absorbed by an elastomer door seal, for example.

FIG. 4 shows a method for closing a vehicle door 101 of a vehicle 100 with respect to a body 102 of the vehicle 100, wherein a first closing element 3 is arranged in a lock mouth 13 of the vehicle door 101 and a second closing element 5 is arranged on the body 102 of the vehicle 100. In a first step of the method, the vehicle door 101 is manually moved S1 in the direction of the body 102 of the vehicle 100. Thereupon, a damping device 7 absorbs S2 kinetic energy of the vehicle door 101 while the vehicle door 101 is within a predetermined limit opening angle of the vehicle door 101 with respect to the body 102 in order to slow down the closing movement of the vehicle door 101, wherein the damping device 7 has an impact element 9, wherein the impact element 9 is arranged on the vehicle door 101 in a displaceable manner with respect to the vehicle door 101 or on the body 102 in a displaceable manner with respect to the vehicle door 101 or on the body 102 in a displaceable manner with respect to the body 102. Thus, the vehicle door 101 rests against the door frame of the body 102 of the vehicle 100. To fix the vehicle door 101 to the body 102 of the vehicle 100, the first closing element and the second closing element are brought into engagement with each other S3 to hold the vehicle door 101 in a positive-locking manner against the body 102. The vehicle door 101 is thus firmly closed. This is followed by the application S4 of a pre-tensioning force, directed in an opening direction of the door, of the vehicle door 101 with respect to the body 102 by an actuator 11, while the first closing element 3 and the second closing element 5 are engaged with each other. This advantageously avoids the door rattling described above.

Although the invention has been further illustrated and explained in detail by preferred exemplary embodiments, the invention is not limited by the disclosed examples, and other variations can be derived therefrom by those skilled in the art without departing from the scope of protection of the invention. It is therefore clear that a plurality of possible variations exists. It is also clear that exemplary embodiments mentioned really only represent examples, which are not to be understood in any way as limiting, for example, the scope of protection, the possible applications or the configuration of the invention. Rather, the preceding description and the figure description enable the person skilled in the art to implement exemplary embodiments in a concrete manner, wherein the person skilled in the art, being aware of the disclosed idea of the invention, can make a variety of changes, for example with respect to the function or arrangement of individual elements mentioned in an exemplary embodiment, without leaving the scope of protection defined by the claims and their legal equivalents, such as further explanations in the description.

The invention claimed is:

1. A door lock arrangement of a vehicle door of a vehicle, the door lock arrangement comprising:

a first closing element arranged in a lock mouth of the vehicle door;

a second closing element arranged on a body of the vehicle, wherein the first closing element and the second closing element are configured to so that the first and second closing elements can be engaged with each other in a positively positive-locking engagement to hold the vehicle door on the body, wherein the lock mouth has a cavity into which the second closing element is inserted when the vehicle door is closed;

a damping device, which absorbs kinetic energy of the vehicle door during a closing movement of the vehicle door within a predetermined limit opening angle of the vehicle door relative to the body and to slow down the closing movement of the vehicle door, wherein the damping device includes an impact element arranged in the lock mouth in a displaceable manner relative to the vehicle door, wherein the impact element is a cylindrical piston; and an actuator connected to the impact element, wherein the actuator applies, via the impact element, a pre-tensioning force to the vehicle door directed in an opening direction of the vehicle door relative to the body while the first and second closing elements are engaged with each other, wherein the actuator is an electric motor combined with a spring element.

2. The door lock arrangement of claim 1, wherein the arrangement of the impact element in the lock mouth in the displaceable manner relative to the vehicle door causes the impact element to press against the second closing element within the predetermined limit opening angle of the vehicle door relative to the body during the closing movement of the vehicle door.

3. The door lock arrangement of claim 1, wherein the first closing element has a rotary latch, and the second closing element has a bolt, wherein, when the first closing element is engaged with the second closing element by rotating the rotary latch around the bolt, the rotary latch and the bolt are fixed to each other.

4. The door lock arrangement of claim 1, wherein the damping device has a fluid damper.

5. The door lock arrangement of claim 4, wherein the fluid damper is a shear damper.

6. A vehicle, comprising:

a body;

a door; and a door lock arrangement, which comprises a first closing element arranged in a lock mouth of the vehicle door;

a second closing element arranged on the body, wherein the first closing element and the second closing element are configured to so that the first and second closing elements can be engaged with each other in a positively positive-locking engagement to hold the vehicle door on the body, wherein the lock mouth has a cavity into which the second closing element is inserted when the vehicle door is closed;

a damping device, which absorbs kinetic energy of the vehicle door during a closing movement of the vehicle door within a predetermined limit opening angle of the vehicle door relative to the body and to slow down the closing movement of the vehicle door, wherein the damping device includes an impact element arranged in the lock mouth in a displaceable manner relative to the vehicle door, wherein the impact element is a cylindrical piston; and an actuator connected to the impact element, wherein the actuator applies, via the impact element, a pre-tensioning force to the vehicle door directed in an opening direction of the vehicle door relative to the body while the first and second closing elements are engaged with each other, wherein the actuator is an electric motor combined with a spring element.

7. A method for closing a vehicle door of a vehicle with respect to a body of the vehicle, wherein a first closing element is arranged in a lock mouth of the vehicle door and a second closing element is arranged on the body of the vehicle, the method comprising:

moving the vehicle door in the direction of the body of the vehicle;

absorbing kinetic energy of the vehicle door with a damping device while the vehicle door is within a predetermined limit opening angle of the vehicle door with respect to the body to slow down the closing movement of the vehicle door, wherein the damping device has an impact element, wherein the impact element is arranged in the lock mouth so that the impact element is displaceable with respect to the vehicle door, wherein the impact element is a cylindrical piston;

bringing the first closing element and the second closing element into engagement with each other for holding the vehicle door on the body in a positive-locking manner, wherein the lock mouth has a cavity into which the second closing element is inserted when the vehicle door is closed; and applying a pre-tensioning force, directed in an opening direction of the vehicle door, to the vehicle door relative to the body by an electric motor combined with a spring element via the impact element while the first and second closing elements are engaged with each other.

8. The vehicle of claim 6, wherein the arrangement of the impact element in the lock mouth in the displaceable manner relative to the vehicle door causes the impact element to be pressed against the second closing element within the predetermined limit opening angle of the vehicle door relative to the body during the closing movement of the vehicle door.

9. The vehicle of claim 6, wherein the first closing element has a rotary latch, and the second closing element has a bolt, wherein, when the first closing element is engaged with the second closing element by rotating the rotary latch around the bolt, the rotary latch and the bolt are fixed to each other.

10. The vehicle of claim 6, wherein the damping device has a fluid damper.

11. The vehicle of claim 10, wherein the fluid damper is a shear damper.

* * * * *